United States Patent [19]

Barton

[11] 4,452,397
[45] Jun. 5, 1984

[54] IRRIGATION SYSTEM

[76] Inventor: Robert I. Barton, 1610 Deauville Ave., Salt Lake City, Utah 84121

[21] Appl. No.: 364,210

[22] Filed: Apr. 1, 1982

[51] Int. Cl.³ .......................... B05B 1/26; B05B 1/32
[52] U.S. Cl. .................................. 239/455; 239/512; 239/547; 239/562; 285/398
[58] Field of Search ............... 239/269, 273, 512, 547, 239/562, 563, 564, 451, 455, 538, 542; 285/398, 371, 307; 403/313

[56] References Cited

U.S. PATENT DOCUMENTS

| | | | |
|---|---|---|---|
| 1,657,538 | 1/1928 | Koepf | 239/562 X |
| 2,470,359 | 5/1949 | McLean | 285/398 X |
| 3,459,377 | 8/1969 | Van der Hulse | 239/562 X |
| 3,630,453 | 12/1971 | Lane | 239/455 |
| 3,735,928 | 5/1973 | Watts et al. | 239/267 |
| 3,899,135 | 8/1975 | O'Brian | 239/562 X |

FOREIGN PATENT DOCUMENTS 1191438  5/1970  United Kingdom ............... 285/307

Primary Examiner—Andres Kashnikow
Attorney, Agent, or Firm—Robert R. Mallinckrodt; Philip A. Mallinckrodt

[57] ABSTRACT

An irrigation system includes an elongate pipe having a plurality of water discharge ports spaced along its length. Each port is individually adjustable, such as by means of a collar about the pipe, to deliver water in a straight stream, spray, trickle, drip, or to be closed completely so that no water is delivered through a particular port. The system is preferably made up of a number of individual lengths of pipe adapted to be easily joined together to give the desired total length.

11 Claims, 7 Drawing Figures

IRRIGATION SYSTEM

BACKGROUND OF THE INVENTION

1. Field

The invention is in the field of irrigation equipment, particularly equipment for providing regulated amounts of water to specific areas.

2. State of the Art

Irrigation systems of various types are well known in the art, the most common systems being furrows or ditches in the earth through which water is run and sprinkler systems which provide a spray of water over a relatively large area. The problem with such systems is that water cannot easily be directed only to specific areas of need and in varying amounts. As a result, much water is wasted.

Various irrigation systems have been developed to try to overcome these problems but none have enjoyed widespread acceptance. For example, U.S. Pat. No. 3,736,755 shows a plastic pipe for drip irrigation having a series of slits therein through which water can flow. The slits are held closed by spring clips placed about the pipe adjacent the slits. With a certain water pressure in the pipe, the slits allow a certain amount of water to flow depending upon the strength of the clips. U.S. Pat. No. 4,246,936 shows specific types of holes to be made in the walls of plastic pipe to provide drip irrigation.

U.S. Pat. Nos. 2,644,718 and 1,964,097 both show sprinkle devices to be placed at any location along a length of pipe or hose. These devices are adapted to create a water spray.

The need remains for a versatile irrigation system that is easy to use and permits an almost infinite choice of the type and amount of water delivered at any particular spot.

SUMMARY OF THE INVENTION

According to the invention, an irrigation system is provided in which a series of discharge ports are spaced along a length of pipe and are individually adjustable to deliver water in a straight stream, spray, trickle, drip, or to be closed so no water is delivered through a particular port. In this way, water can be simultaneously delivered to selected areas in selected quantity.

The irrigation system comprises an elongate pipe having a plurality of water discharge ports spaced along its length, preferably in alignment. A collar is provided about the pipe at the location of each port, each collar having an opening therein, such as a longitudinal split, which is large enough to expose the discharge port. One edge of the opening and the immediately adjacent area snugly fits against the pipe so that the edge is progressively moved over the discharge port, it progressively blocks the port until the port is completely blocked. The other edge of the opening is beveled away from the pipe so that as that edge is moved over the discharge port, it deflects a stream of water from the discharge port into a spray. One end of the pipe is connected to a source of water, such as an ordinary garden hose, while the other end of the pipe is closed such as by a pipe cap.

The system conveniently is made up of a number of individual lengths of pipe joined together to give a pipe of desired total length. For this purpose, it is preferred that the individual lengths of pipe can be adapted to be easily joined in a leakproof connection and that a separate section for connection to the source of water be provided to be connected to one end of the total length while a separate terminating section having a closed end be provided for connection to the opposite end of the total length.

DRAWINGS

In the accompanying drawings, which represents the best mode presently contemplated for carrying out the invention:

FIG. 1 is a top plan view of an irrigation system of the present invention showing a portion thereof broken away;

FIG. 2, a vertical section taken along the line 2—2 of FIG. 1 showing a discharge port and flow controlling collar in open position;

FIG. 3, a view similar to that of FIG. 2, but showing the collar rotated clockwise from the position of FIG. 2 so that the beveled edge of the collar opening is over the discharge port;

FIG. 4, a view similar to that of FIG. 2, but showing the collar rotated counterclockwise from the position of FIG. 2 so that a portion of the snugly fitting edge of the collar opening is blocking a portion of the discharge port;

FIG. 5, a longitudinal section through an end of pipe section showing the means used to join sections together;

FIG. 6, a longitudinal section through the end of a pipe section which is adapted to join to the end shown in FIG. 5; and FIG. 7, a side elevation of a pipe support for the system.

DETAILED DESCRIPTION OF THE ILLUSTRATED EMBODIMENT

Figure 1:
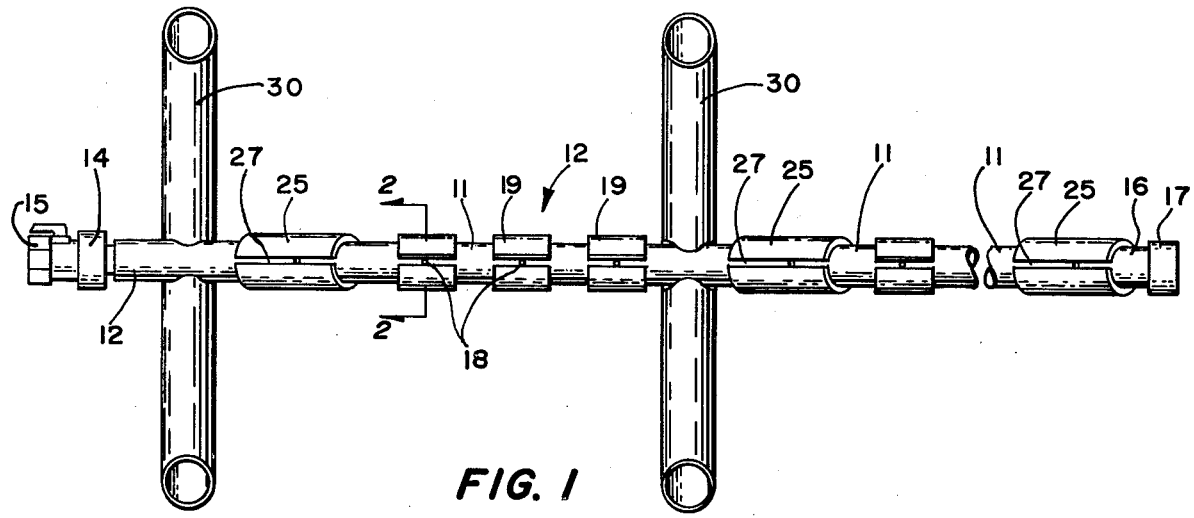

Referring to FIG. 1, the present irrigation system is preferably of modular construction and includes a number of individual pipe sections 11 connected together to form an elongate pipe 12 to cover the area to be irrigated. A short pipe section is connected to the upstream end of pipe 12 and is provided with a female hose coupling 14. In some instances, it will be desirable to provide a water flow control valve 15 between coupling 14 and a hose which may be connected to the system. Such control valve permits adjustment of the water pressure at the location of pipe 12, rather than at the water supply which may be removed from the irrigation system. A short length of pipe 16 with cap 17 secured thereto is connected to the downstream end of pipe 12 to close it.

Figure 2:
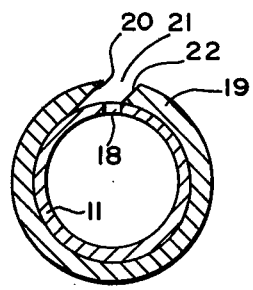
Figure 3:
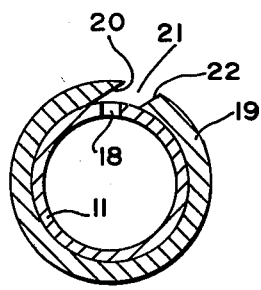
Figure 4:
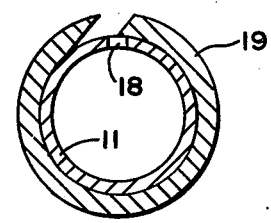

A series of discharge ports 18 are spaced along the length of pipe sections 11. The discharge ports are illustrated as being along the upper surface of the pipe. A collar means 19 for controlling the flow of water from discharge ports 18 is associated with each discharge port. The collar means preferably takes the form of a snugly fitting, longitudinally split collar about pipe 11 at the location of each port. As shown in FIGS. 2-4, the sleeve is split at an angle so that edge 20 is beveled away from the surface of pipe 11. Usually some material will be removed from collar 19 so that the opening 21 formed by the split is large enough to completely expose discharge port 18 when in position as shown in FIG. 2. In this position, water flows from the discharge port in a straight stream. When the sleeve is rotated clockwise to bring the beveled edge 20 over the discharge port 18 as shown in FIG. 3, the water stream from discharge port 18 impinges against the edge causing the stream to form into a spray. When the sleeve is rotated counter clockwise to bring edge 22 over the discharge port, as shown in FIG. 4, the effective size of the port is reduced so the flow is restricted. By selective rotation of the sleeve, the flow from the discharge port can be restricted to a fine stream or a dribble, or by continued rotation, can be blocked off completely.

Figure 5:
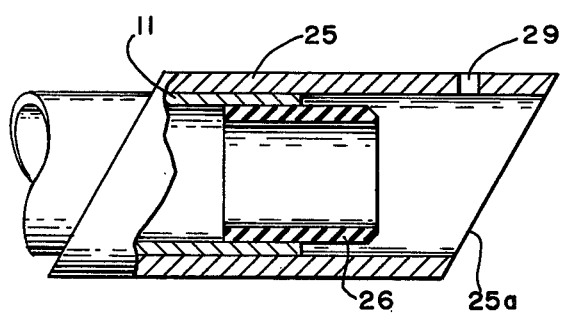
Figure 6:
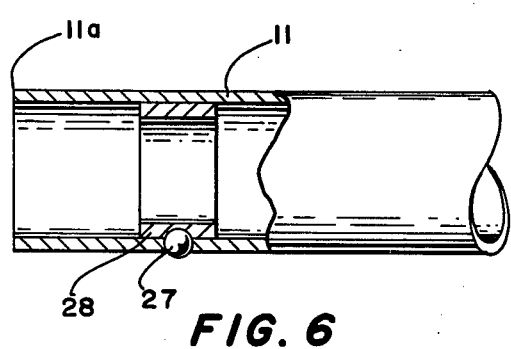

Each pipe section 11 has a joining means at one end and has its other end adapted to mate with a joining means of another section. Thus, each pipe section 11 has a sleeve 25, FIGS. 1 and 5, secured to one end thereof. The sleeve is secured to the pipe so that a portion of it extends beyond the end of the pipe to receive the mating end, FIG. 6, of a pipe section therein. A short section of compressible hose 26, such as rubber or plastic hose, is secured interiorly of the end section 11 and extends beyond the end of such pipe section, but not as far as does sleeve 25. As a mating end of a pipe section 11 is pushed into sleeve 25, it will move over hose 26 so that hose 26 will span the joint between the two sections to prevent leakage of water. Sleeve 25 fits very snugly about pipe 11 and is preferably split, as at 27, FIG. 1, so that it can expand slightly as the mating end of a pipe section 11 is slid into it. This makes connecting the sections easier than would be the case if the sleeve was not split. Also, the outer edge 11a of mating pipe section 11 is beveled slightly to facilitate its entrance into sleeve 25.

It is preferred that some form of locking be provided for the joined pipe sections to better hold them together and to ensure alignment of the water discharge ports along the length of the pipe. For this purpose, a protrusion 27 is provided near the end of the mating end of each pipe section 11. The protrusion is preferably a steel ball positioned in a tapered hole so that the surface of the ball extends above the surface of the pipe. The ball is seated in the tapered hole and held in place by a resilient clip 28 which is positioned within the pipe and bears against the ball. Sleeve 25 is provided with a receiving hole 29 for the ball. To assemble the two pipe sections, the mating end of a section is inserted into the open end of sleeve 25. The pipe sections are forced together until the ends of the sections abut and are then rotated so that ball 27 is received within opening 29 to lock the pipe sections together.

It is preferred that the outer end sleeve 25 be cut at an angle as at 25a and that the angle be such that hole 29 be located over a cut away portion of the sleeve. This configuration of the sleeve greatly facilitates easy connection of the pipe sections making it easier to insert the mating end of a pipe section into the sleeve, and also, with ball 27 in the mating end of a pipe section, allowing the section to be rotated so that the ends of the pipe abut before the ball is forced under the sleeve. The pipe sections can then be easily rotated with respect to one another to force the ball under sleeve 25 and bring it into alignment with hole 29. Only the outer end of the sleeve need be cut at an angle to give this ease of connection, but usually both ends will be cut at an angle merely because of the ease of production.

It is preferred that the joining means of each section of pipe be located on the downstream end of the pipe, which is the upstream end of the joint itself. In this way, leakage at the joint is minimized or eliminated because hose section 26 is secured and sealed to the upstream pipe. Water then has to flow in the opposite direction if it is to escape around hose section 26.

Figure 7:
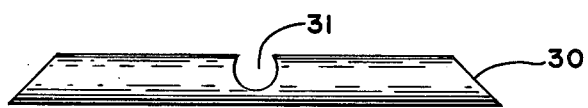

A support 30 for pipe sections 11, FIGS. 1 and 7, is conveniently made of a length of pipe of greater diameter than pipe sections 11 and having a hole 31 adjacent the upper surface. For a tight-fitting support, the hole 31 has a diameter slightly smaller than that of pipe section 11 and its axis is normal to the longitudinal axis of the pipe. The hole 31 is open at the upper edge, so that pipe section 11 may be snapped in and held in place. The tight-fitting support will generally be used at the head end of the pipe, near the water connection, so that the pipe section can be rotated about its longitudinal axis to bring the discharge ports into the desired position relative to the plants to be irrigated and then be held in that position by the support. Loose fitting supports, which have hole 31 slightly larger than the diameter of pipe sections 11, are used along the length of the pipe. The pipe can move freely in these supports as it is rotated but the supports tend to hold the pipe in position on the ground. While the pipe 12 is shown lying along the ground with supports 30 also on the ground, the pipe could easily be supported above the ground by placing one end of supports 30 vertically over stakes driven into the ground.

The irrigation system is preferably formed of standard polyvinylchloride or similar plastic pipe. The flow controlling collar 19 are made from short pieces of plastic pipe dimensioned to fit tightly over the pipe sections 11 about discharge ports 18. The sleeves 20 are similarly made from plastic pipe which may be split or not, depending upon how closely it fits on the pipe section. Both the collars 19 and the sleeves 20 may be made of pieces of plastic pipe having an inside diameter slightly less than the outside diameter of the pipe on which they are mounted so that they are expanded slightly and fit snugly when in position. This establishes a resilient holding force to keep the collars in their set positions and to more firmly hold joined sections of pipe within the sleeves. The clip 28 is formed from a short piece of plastic pipe from which a segment is removed to permit the piece to be compressed to a small enough diameter to be received within the pipe section. When the compression force is released, the clip expands and presses against the interior surface of the pipe secton and retains the ball in the tapered opening so it protrudes above the exterior surface of the pipe section.

The irrigation system described has the flexibility to simultaneously vary the amount and method of delivering water to any location along its length. One or more discharge ports can be closed, while other ports are adjusted to dribble water in some areas, spray water in varying amounts in other areas, and deliver a solid stream of water in still other areas. The system can be used for long runs or short runs by varying the number of pipe sections used and by using pipe sections that have various angles built in, can be assembled int shapes other than merely straight. The pipe sections are preferably made in lengths of about five feet for ease of handling and transport, but the whole system could be made in a single piece, if desired. Also, while separate pieces are shown for the termination of the system and for the means of attaching the system to a source of water, these means could be included as parts of an initial section of pipe and an end section of pipe.

The irrigation system may be connected to any type of water supply. The system as shown in FIG. 1 is specifically adapted to be connected to the usual garden hose and may include the flow control 15 as shown. Such flow control is particularly useful when the system is located some distance from the water source to which the hose is attached, or when several systems are connected in parallel so that each can be individually controlled. Rather than a hose supplying water, the system could open into an irrigation ditch or other similar source of water or could be connected by various other types of hoses or pipes to pressure or non-pressure water sources.

Also, the size of the pipe used in the system can vary greatly. Pipe of a size similar to that in which pressurized water is supplied to the system may be used where pressurized streams of water from the discharge ports are desired, or much larger pipe may be used in the system to reduce the pressure of water from the discharge ports. Many combinations and variations will be obvious to those skilled in the art.

While the discharge ports are shown aligned along one side of the pipe so they all face the same direction, in some instances it may be desirable to vary the facing of the discharge ports to some extent to provide for diverging streams of water.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. An irrigation system for supplying water in selected quantities to selected areas, comprising an elongate pipe having a plurality of water discharge ports spaced therealong; an equal plurality of collar means mounted about the pipe for rotation, each collar means being associated with a different one of said water discharge ports and having an opening therein large enough to completely expose said discharge port, one edge of said opening and the area adjacent thereto being snugly fitted against said pipe so that, as that edge and adjacent area of the collar is progressively moved over its associated discharge port, the port is progressively blocked until it is completely blocked; the opposite edge of said opening being beveled away from the pipe so that, when said beveled surface is over the discharge port, it deflects a stream of water from the discharge port to form a spray; means for connecting one end of the pipe to a source of water; and means for closing the other end of the pipe so that water entering the pipe flows out the discharge ports as controlled by the collars.

2. An irrigation system according to claim 1, wherein the collar opening is a gap formed by a longitudinal split in the collar.

3. An irrigation system according to claim 1, wherein the elongate pipe is made up of sections of shorter lengths of pipe, several such sections being joined together to provide the desired length of elongate pipe, each section having joining means at one end thereof and having the other end adapted to mate with similar joining means so that the joining means of one section mates with the mating end of an adjacent section to secure the sections together.

4. An irrigation system according to claim 3, wherein the means connecting one end of the pipe to a source of water is a short section of pipe with such means provided on one end thereof, the other end thereof being adapted to be joined to one end of the elongate pipe, and the means closing the pipe is a short section of pipe with such means provided at one end thereof, the other end thereof being adapted to be joined to the other end of the elongate pipe.

5. An irrigation system according to claim 4, wherein the joining means includes a sleeve secured to the pipe and extending beyond the end of the pipe to receive therein the mating end of an adjacent pipe and a resilient hose secured inside the pipe and extending beyond the end of the pipe to be received inside the mating end of the adjacent pipe.

6. An irrigation system according to claim 5, wherein the joining means includes means for locking the joined sections together in alignment so that all discharge ports are facing one direction.

7. An irrigation system according to claim 3, wherein the joining means includes a sleeve secured to the pipe and extending beyond the end of the pipe to receive therein the mating end of an adjacent pipe and a resilient hose secured inside the pipe and extending beyond the end of the pipe to be received inside the mating end of the adjacent pipe.

8. An irrigation system according to claim 7, wherein the joining means includes means for locking the joined sections together in alignment so that all discharge ports are facing one direction.

9. An irrigation system according to claim 1, wherein the elongate pipe and collar means are made of a plastic material.

10. For use in a pipe irrigation system, a collar fitting for mounting on a water discharge pipe as a close-hugging, concentric sleeve frictionally held in position over a jet discharge port in the side of the pipe so as to be adjustable about the circumference of the pipe, said collar fitting being split longitudinally to provide a longitudinal gap of width of width at least as great as the width of the discharge port so that with the gap in substantially radial alignment with the jet discharge port of the pipe, flow of water from the port is unobstructed, said gap being defined by non-radial surfaces, at least one of which is adapted to be positioned to overhang the jet discharge port as a deflector for the jet of water emerging from said port.

11. A collar fitting according to claim 10, wherein the normal internal diameter thereof is slightly less than the outside diameter of the pipe on which it is adapted to fit so the girth of said fitting will expand slightly upon installation of the fitting on said path to establish resilient holding tension against undesired movement about the circumference of the pipes.

* * * * *